United States Patent [19]

Pizzuti

[11] 4,081,808
[45] Mar. 28, 1978

[54] ERECTING LINKAGE AND COVER ASSEMBLY FOR PHOTOGRAPHIC CAMERAS

[75] Inventor: Donato F. Pizzuti, Saugus, Mass.

[73] Assignee: Polaroid Corporation, Cambridge, Mass.

[21] Appl. No.: 719,842

[22] Filed: Sep. 2, 1976

[51] Int. Cl.² .............................................. G03B 17/04
[52] U.S. Cl. ..................................... 354/193; 354/189
[58] Field of Search ................ 354/189, 192, 193, 187

[56] References Cited

U.S. PATENT DOCUMENTS

| | | | |
|---|---|---|---|
| 1,575,836 | 3/1926 | Hutchings | 354/189 |
| 2,325,346 | 7/1943 | Thomas | 354/193 |
| 2,481,661 | 9/1949 | Harvey | 354/193 |
| 2,941,460 | 6/1960 | Eburn | 354/193 |

*Primary Examiner*—John Gonzales
*Attorney, Agent, or Firm*—David R. Thornton

[57] ABSTRACT

An erecting linkage and cover assembly for collapsible bellows-type cameras having a lens supporting shutter housing movable between erected and closed positions with respect to a camera body. The erecting linkage includes a pair of folding linkage sets connected between the camera body, the housing and a pivotal cover and operable in a manner to retain the lens supporting shutter housing positively in the erected condition of the camera. The linkage is associated with the shutter housing by way of an adjustable locating frame in a manner such that accurate calibration of shutter housing and thus lens orientation with respect to the camera body is facilitated. Also, the cover is provided with a latch arrangement by which the cover is releasably retained in a closed position overlying the shutter housing and lens against the front of the camera body. The latch means further operates to initiate movement of the erecting linkage from its erected condition to its folded condition.

13 Claims, 8 Drawing Figures

ERECTING LINKAGE AND COVER ASSEMBLY FOR PHOTOGRAPHIC CAMERAS

BACKGROUND OF THE INVENTION

This invention relates to photographic cameras and more particularly, it concerns an improved cover plate and erecting linkage assembly for bellows-type collapsible cameras.

Collapsible bellows cameras conventionally incorporate a rearwardly disposed body or film housing in which film is loaded for exposure through a lens supported on the front face of a shutter housing movably connected to the film housing by a collapsible bellows providing a light-tight chamber between such housings. The shutter housing is supported by an erecting linkage in a manner facilitating its movement between a collapsed condition against the film housing and an erect or operative condition in which the lens is properly oriented with the optical axis of the camera and with the plane of the film in the film housing. A protective cover is typically associated with the erecting linkage in a manner to be movable between an opened position when the camera is erected and a closed position over the lens, the shutter housing and bellows, in the collapsed condition of the camera, to protect the lens and other delicate components from damage by impact when the camera is carried and also from foreign materials such as dust and the like.

Because the foldable bellows is essentially non-supporting in a structural sense, the erecting linkage provides a sole supporting structure for maintaining optical orientation of the shutter housing and lens in relation to the film to be exposed. As such, the linkage must function with precision and must exhibit sufficient strength and ruggedness to maintain such precision through repeated camera collapsing and erecting cycles. Additionally, there is a need for an easily releasable and yet positive latching arrangement particularly to retain the linkage in its erected condition as well as to retain the protective cover in a closed position against the film housing while the camera is in a collapsed condition.

While the functional requirements of erecting linkage for collapsible cameras have been met by several designs which have existed in the photographic art for many years, there is need for improvement particularly in the achievement of these functional requirements at reduced materials and manufacturing costs. With respect to materials, current state of the art coupled with the strength and precision requirements of the erecting linkage require the use of metal for linkage components. Accordingly, economy in the linkage components is directed primarily to the use of mass production die-stamping techniques in the formation of the erecting linkage components. However, such camera components as the film housing, the shutter housing and the cover are more readily suited to lower-priced materials such as molded plastics. Thus, an effective camera design from a materials cost standpoint, should maximize the use of lower-cost materials where strength and precision requirements permit.

Ease of assembly without compromise of accuracy is also a goal from the standpoint of overall cost reduction. With respect to ease of assembly, the design of each individual component, regardless of the materials from which it is formed, is critical not only with respect to the ultimate camera function served by each component, but from the standpoint of the manner in which each such component may be assembled in the camera. Assembly costs may be further reduced if the overall design provides a capability for final calibration of the assembled parts. In this latter respect, the precise position of the lens and shutter housing with respect to the film plane of the film housing, when the camera is in an erected or operative position, cannot be compromised in a viable photographic camera design.

SUMMARY OF THE INVENTION

In accordance with the present invention, an improved erecting linkage for collapsible cameras is provided in which a pair of foldable linkage sets interconnect the camera body or film housing with the shutter housing and cover in a manner facilitating adjustment of the camera between collapsed and erected conditions as well as minimizing manufacturing costs incident to materials, assembly and calibration of the assembled camera without comprising camera ruggedness and precision. Each such linkage set requires a minimum number of pin-connected die-stamped metal links cooperable with opposite sides of a cover frame and a shutter housing mounting plate to assure positive control of shutter housing orientation in the erected camera and also to facilitate angular adjustment of the erect shutter housing with respect to the film plane defined by the body.

Parallel or coordinated operation of both linkage sets is assured by the connection thereof between the relatively rigid camera body and the die-stamped metal cover frame or spider which is resistent to flexure from a plane pivotal with respect to the camera body as a result of cross-sectional rigidity in the frame structure. The structure of the frame or spider enables the cover, perferrably formed of plastic materials, to be securely interconnected to the frame without need for auxiliary connecting means other than that incorporated in the structure of the linkage frame and cover. Also, a single latch structure functions both to release the linkage assembly from an erected condition and to retain the collapsed condition of the camera.

Among the objects of the present invention are therefore: the provision of an improved erecting linkage for collapsible bellows-type cameras; the provision of such an erecting linkage which facilitates precise calibration of shutter housing orientation with respect to the film plane defined by the camera body; the provision of such an erecting linkage which is capable of being positively latched in both the erected and collapsed conditions and yet easily released from either of such latched conditions; the provision of such an erecting linkage and cover assembly for collapsible cameras wherein the use of relatively low-cost plastic materials is maximized; the provision of such an erecting linkage and cover assembly by which manufacturing costs are minimized without compromise of ruggedness or optical precision of the camera in which it is used; the provision of such an erecting linkage and cover assembly which is easily manipulated in its adjustment between the erected and collapsed conditions; and the provision of such an erecting linkage and cover assembly in which protection is afforded by the cover against damage to camera components by impact and/or fouling by foreign material.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
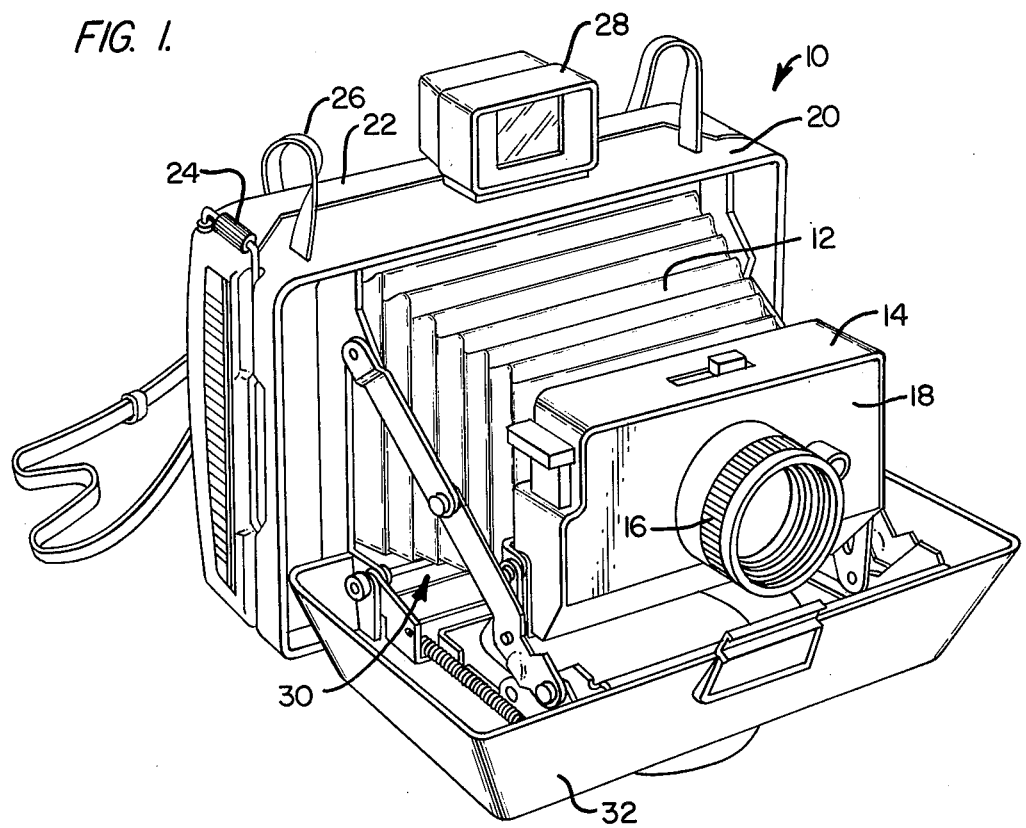
FIG. 1 is a perspective view of an erected collapsible bellows-type camera incorporating the erecting linkage assembly of the present invention.
Figure 2:
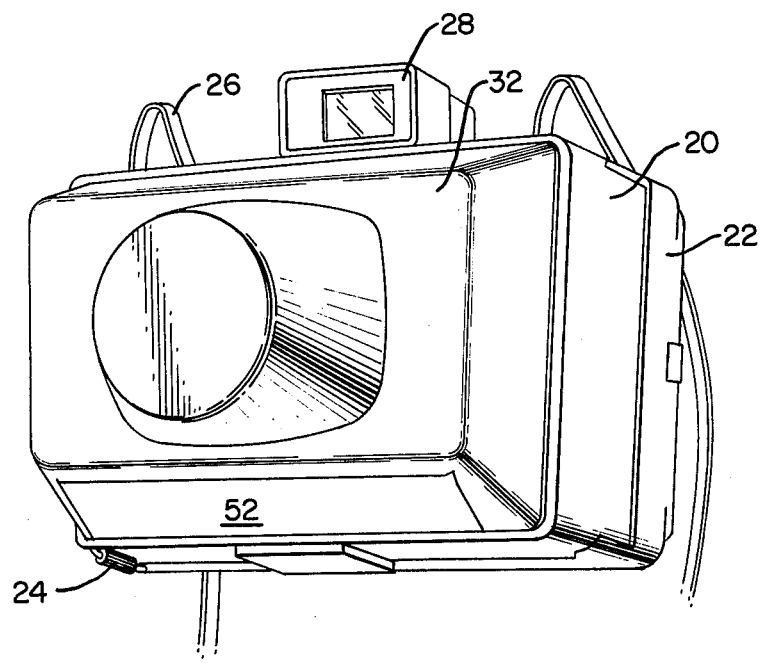
FIG. 2 is a perspective view of the same camera in a collapsed condition.

In FIGS. 1 and 2 of the drawings, a large format collapsible bellows camera is shown to include a film housing generally designated by the reference numeral 10 and connected by a foldable bellows 12 to a shutter housing 14 which supports an objective lens 16 on the front face 18 thereof. The film housing 10 includes a body 20 to which a rear film access door is pivotally connected at one end and secured at the other end by a latch bail 24. A carrying strap 26 and viewfinder 28 are secured to the top of the housing body 20 in conventional fashion, as shown.

The erecting linkage system of the present invention is generally designated in FIG. 1 by the reference numeral 30 and as will become more apparent from the description to follow herein, is interconnected with the shutter housing 14 as well as with a front cover 32. The cover is associated with the linkage 30 and with the housing body 20 in a manner to pivot with respect to the latter from an open position in which it extends at essentially right angles to the front of the body 20, as shown in FIG. 1, to a closed position illustrated in FIG. 2 of the drawings. In the closed position, the cover 32 defines with the housing body 20 an enclosure for the shutter housing 14, the lens 16 mounted thereon as well as the linkage 30 which in the closed position of the cover 32, is folded or collapsed again in a manner which will be described more fully below.

Figure 3:
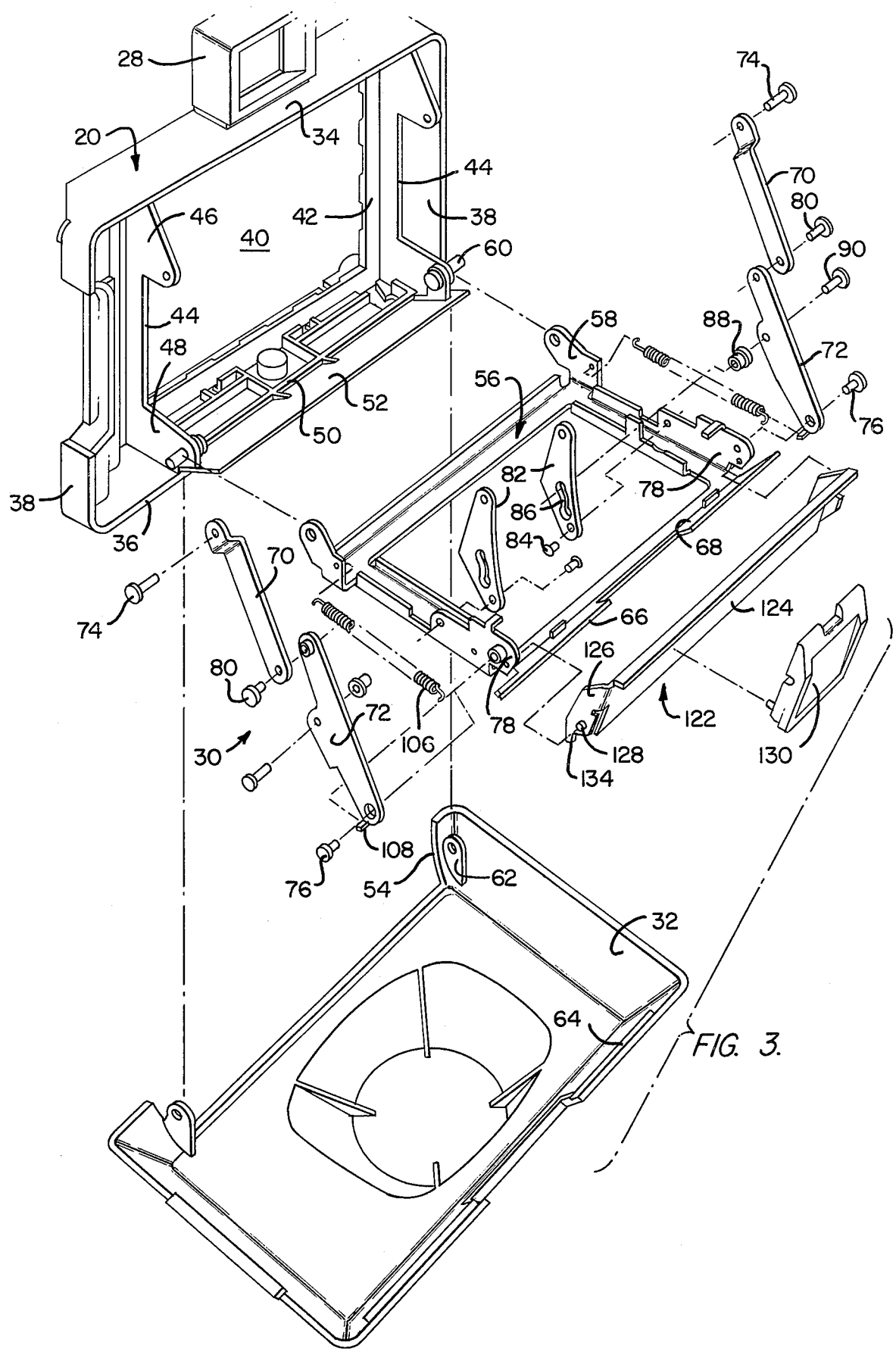
FIG. 3 is an exploded perspective view illustrating the components of the linkage assembly of the present invention.

An understanding of the components incorporated in the linkage assembly 30 as well as the interconnection of these components with the housing body 20 and the cover 32 will be gained most readily by reference to FIG. 3 of the drawings. As shown, the housing body 20 is an essentially integral molding of plastic material such as an ABS resin (Acrylonitrile-butadiene-styrene). Such resins represent a relatively low-cost, easily-molded plastic material which provides adequate strength and rigidity for use in such components as the housing body 20, the access door 22, the cover 32 as well as other components in the camera. The housing body 20 is shaped to define an essentially rectangular frame structure having respective top, bottom and side walls, 34, 36 and 38, of sufficient depth to render the body resistent to flexure. A format framing window 40 is defined by a medial web 42 and centered between a pair of linkage mounting flanges 44 of similar configuration such that each defines upper and lower pivot brackets 46 and 48, respectively. Positioned on the interior of the bottom wall 36 between the flanges 44 is a tripod mount 50 having a forwardly and upwardly extending flange 52 receivable in a cut-out 54 in the cover 32 of the fully assembled camera. As shown in FIG. 2 of the drawings, the flange 52 is flush with or defines an exterior surface contour continuous with the exterior surface contour of the cover 32.

The cover 32, which is preferrably formed also of ABS resin as above mentioned, is secured against a die-stamped cover frame or spider 56 having a pair of rearwardly projecting and apertured flange portions 58 pivotally secured to the lower pivot brackets 48 of the housing body 20 by pins 60. The pins 60 also extend through apertured bosses 62 formed in the cover 32 to retain the base portion of the cover on the housing body 20 and against the inner end portion of the spider 56. The inside of the cover edge opposite the bosses 62 is provided with a projecting lip 64 engagable about the outer edge 66 of a corresponding flange portion 68 on the spider 56. Thus, it will be appreciated that the cover 32 will be secured to and move at all times with the spider 56.

Interconnected between the spider 56 and the upper pivot brackets 46 on the housing body 20 are a pair of folding linkage sets, each such set including upper and lower links 70 and 72, respectively. The upper ends of the upper links 70 are pivotally connected to the pivot brackets 46 by pins 74 whereas the lower ends of the lower links 72 are connected by similar pins 76 to the front ends of side member flanges 78 on the spider 56. The links are pivotally interconnected to each other by pins 80. A pair of cam links 82 are pivotally connected at their lower ends by pins 84 to the side member flanges 78 but inwardly of the spider from the pivotal connection of the lower links 72. Each of the cam links 82 is provided with a cam slot 86 which receives a follower sleeve 88 secured on the inner end of a mounting pin 90 extending through an appropriate aperture in each of the lower links 72.

Figure 4:
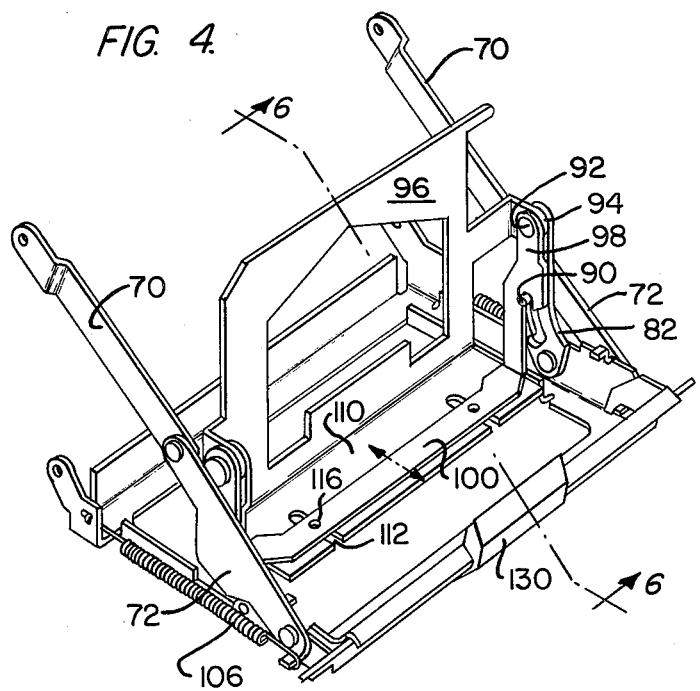
FIG. 4 is a perspective view of the erecting linkage assembly with certain of the camera parts removed.
Figure 8:
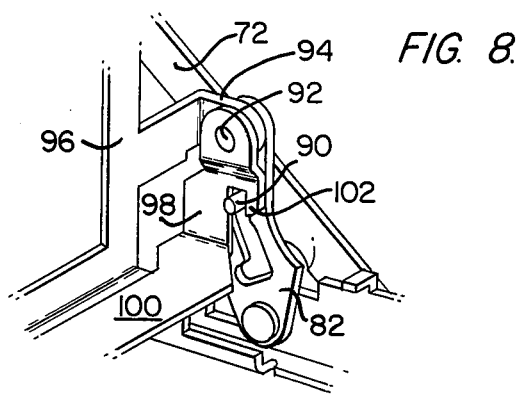
FIG. 8 is a fragmentary perspective view illustrating a shutter housing positioning latch incorporated in the linkage of the invention.

As shown in FIG. 4 of the drawings, the cam links 82 are pivotally connected at their upper ends by pins 92 to a pair of apertured ears 94 on a shutter mounting plate 96 as well as to the upper ends of leg portions 98 of a generally U-shaped shutter locating frame 100. Although the function of the shutter mounting plate 96 and shutter locating frame 100 will be described in more detail below, it will be noted in FIG. 4 and also in FIG. 8 that each of the locating frame legs 98 is provided with a latch formation 103 engageable with the inwardly projecting end of the pin 90 extending with the follower sleeve 88 through the cam slots 86 in the cam links 82. Because of the spacing between the pin 92 connected to the upper end of the cam links 82 and the follower pin 90, it will be appreciated that pivotal movement of the shutter locating frame 100 will be prevented when the pins 92 and 90 are retained in a fixed, stationary position. Moreover, this condition will exist when the lower links 72 are in a fixed erected or unfolded position relative to the spider 56 because of the connection of the pin 90 to the lower links 72 and of the pivotal connection by the pins 84 of the cam links 82 to the spider 56.

Figure 6:
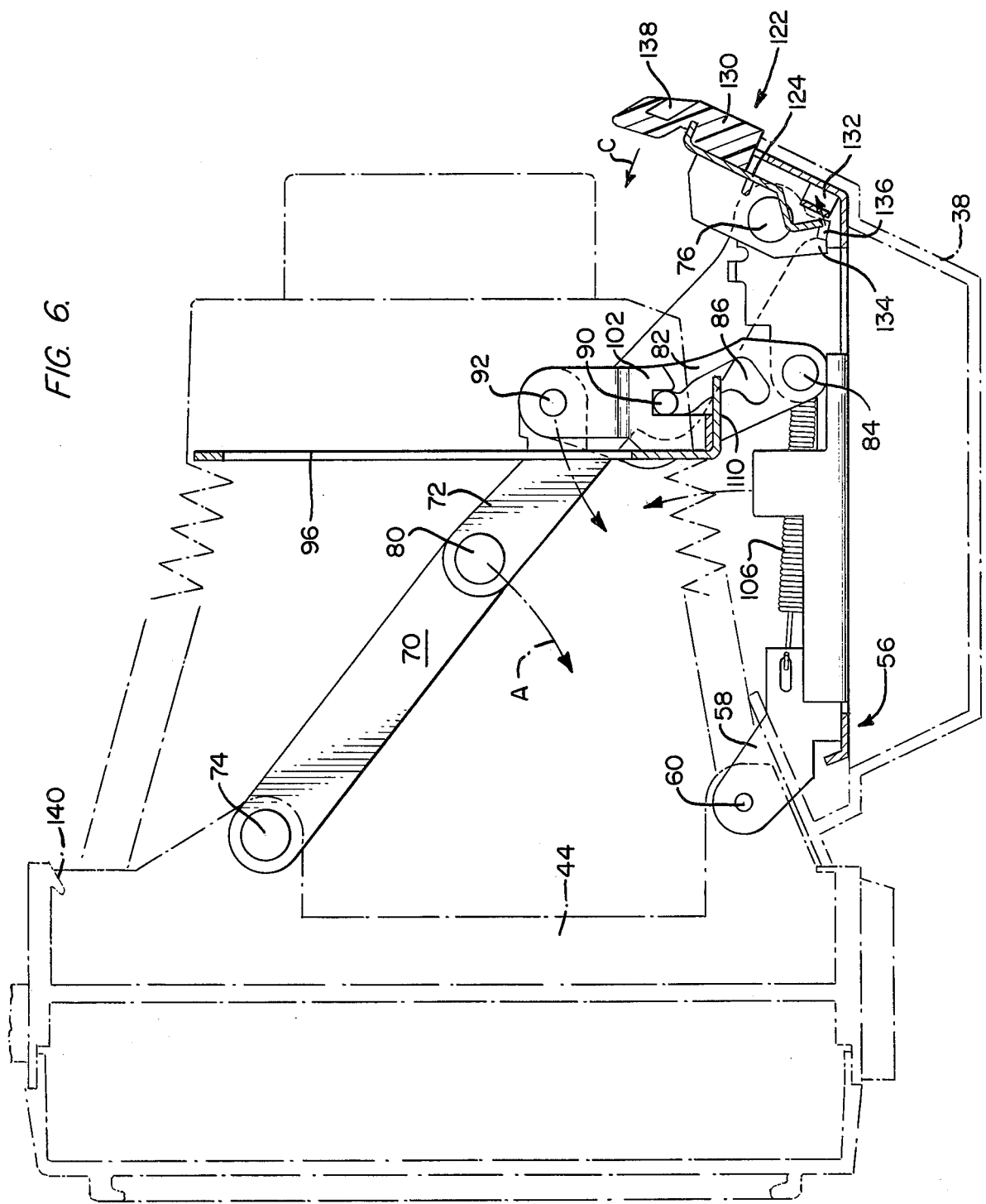
FIG. 6 is an enlarged side elevation of the erecting linkage of the present invention in an erected condition.
Figure 7:
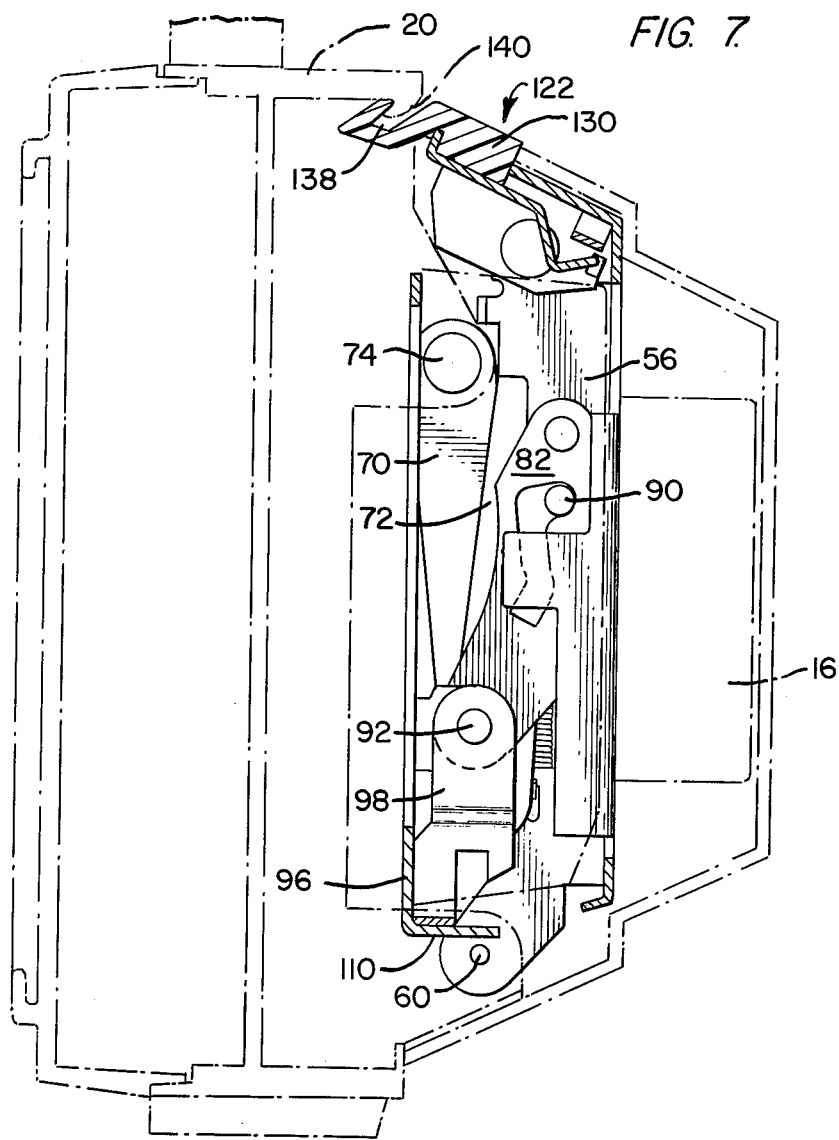
FIG. 7 is a similar view of the erecting linkage but in a collapsed condition.

Operation of the linkage system 30 during adjustment of the camera between the erect and collapsed conditions shown respectively in FIGS. 1 and 2 may be understood by reference to FIGS. 6 and 7 of the drawings. In the erected condition of the linkage system 30, it will be noted that the upper and lower pairs of links 70 and 72 are positioned such that the axis of the pins 80 interconnecting the links lies outside of a line extending between the axis of the pins 74 and 76 or in a past-dead-center position with the pin 90 engaged against the end of the cam slot 86 and in the latching formation 102 of the shutter locating frame 100. This past-dead-center position of the links 70 and 72 is maintained by tension springs 106 extending between the pivot flanges 58 on the spider 56 and a tab 108 at the lower end of each of the lower links 72 underlying the axes the pin 76 in a manner to bias the links to the position shown in FIG. 6. Upon folding the links 70 and 72 in the direction of the arrow A in FIG. 6, back past the dead-center position, the spider 56 and cover 38 connected thereto will be pivoted upwardly toward the housing body 20. The pin 90 will drop with the lower link 72 out of the latch formation 102 and downwardly in the cam slot 86 of the cam links 82 causing the cam links to pivot counterclockwise about the pin 84 (FIG. 6). Once the pin 90 becomes disengaged with the latching formation 102, the shutter housing 14 will be freely pivotal on the axis of the pins 92 and move rearwardly in an essential parallel orientation with the body 26 due to the bellows 12.

Movement of the linkage system components during erection of the camera from the collapsed condition shown in FIGS. 2 and 7 is essentially a reversal of that described in the preceding paragraph. In other words, the links 70 and 72 unfold with opening pivotal movement of the cover 38 and spider 56, causing the pin 90 to ride in the cam slot 86 of the cam links 82 and into the notch of the latching formation 102 essentially as shown in FIG. 6 of the drawings.

Figure 5:
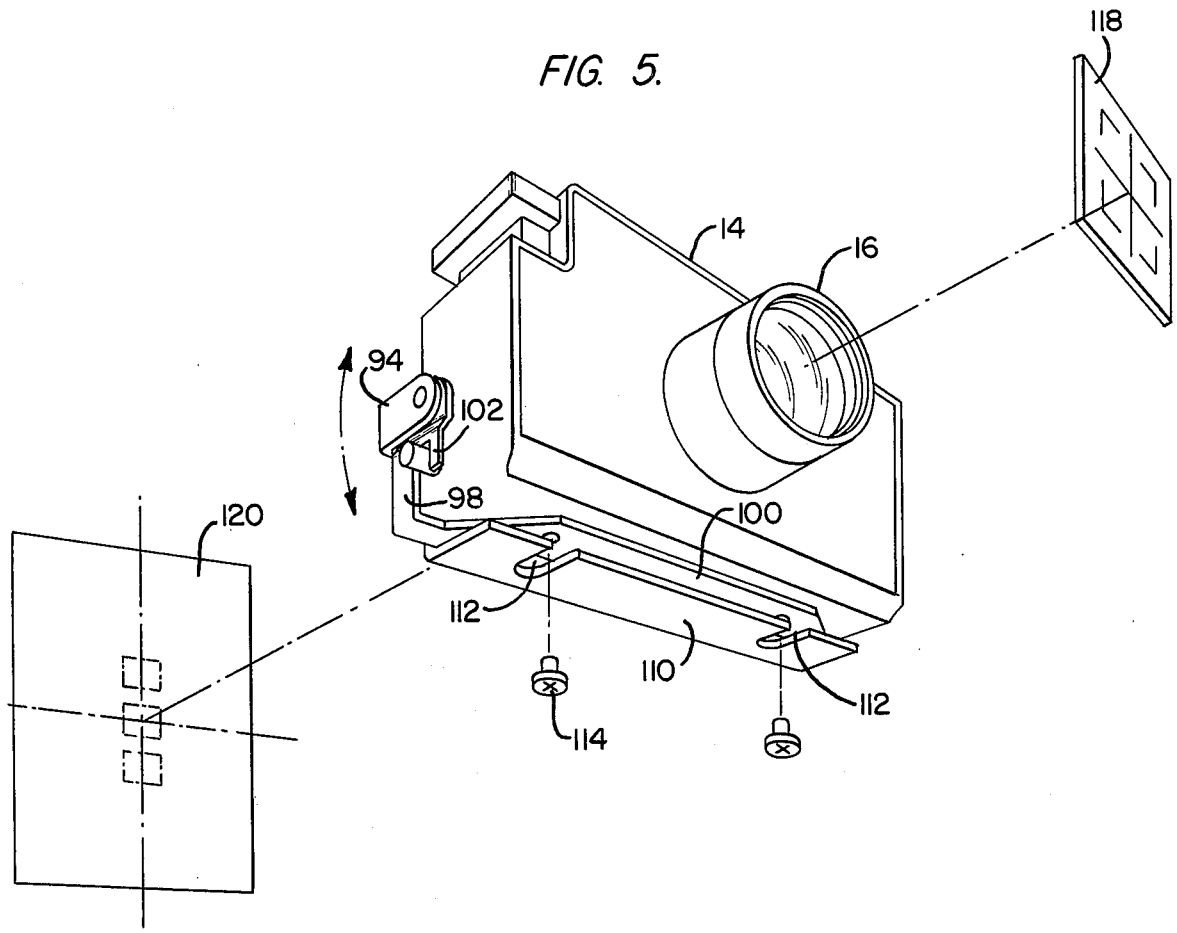
FIG. 5 is a perspective view depicting the calibration of a camera shutter housing supported by the erecting linkage of the present invention.

From the preceding description, it will be apparent that the position of the shutter locating frame 100, particularly in the erected condition of the camera, will be fixed as a result of the described operation of the linkage system 30. Although the pivotal interconnection of the respective linkage components coupled with the formation of these components from die-stamped metals such as high-strength steel stock would assure reasonable positional continuity after repeated cycles of collapsing and erecting the camera, the manufacturing tolerances incident to mass production die-stamping techniques give rise to a need for optical calibration of the shutter housing with respect to the plane of the format framing window 40 in the camera housing body 20 particularly about the axis of the housing parallel with the axes of the several pivot pins of the linkage assembly 30. To this end, and as shown most clearly in FIGS. 4 and 5 of the drawings, the shutter mounting plate 96 to which the shutter housing 14 is fixedly connected, though pivotally connected on the axes of the pins 92, is adjustable about that axis as a result of a connection with the locating frame 100. In particular, the shutter mounting plate 96 is provided with a flange 110 extending at right angles to the plane of the plate 96 and having a pair of slots 112. Set screws 114 extend through the slots 112 to be received in internally threaded apertures 116 in the base of the shutter locating frame 100. It will be appreciated, therefore, that the angular disposition of the shutter mounting plate 96 about the axes of the pins 92 may be adjustably calibrated by loosening the set screws 114 and sliding the flange forwardly or rearwardly with respect to the frame 100. The manner in which this is accomplished is depicted by FIG. 5 of the drawings. Specifically, the assembled camera in the erected condition is trained on a target 118 in a manner to develop an image on a screen 120 positioned on the optical axis of the erected camera. Set screws 114 may then be loosened and the shutter housing 14 fixed to the plate 96 adjustably pivoted about the axes of the pins 92 until the projected image is properly centered on the screen 120. The screws are then tightened in a manner to secure the adjusted position of the shutter housing with respect to the locating frame 100.

Operation of the erecting linkage system in the manner described above is facilitated by a releasable latching assembly designated by the reference numeral 122 and shown most clearly in FIGS. 3, 6 and 7 of the drawings. This assembly includes a die-stamped bar 122 having inwardly turned flanges 126 at opposite ends and supporting pins 128 receivable in apertures formed on the side member flanges 78 of the spider 56. A latch handle 130 of synthetic resinous material is molded to the exterior of the bar 124 and centrally thereof to effect manual pivotal motion of the bar about the axis of the pins 128. Such pivotal motion in the direction of the arrow C (FIG. 6) is yieldably opposed by a leaf spring 132 acting in a compressive mode between the lower edge portion of the bar 124 and the flange 68.

The inwardly turned flange portions 126 on the bar 124 are provided with depending lugs 134 positioned to engage inwardly directed ears 136 formed integrally on the lower links 72 and extending in the direction opposite from the spring tabs 108. Thus, with the camera in the erected condition shown in FIG. 6, depression on the latch handle 130 to pivot the arm 124 about the axis of the pins 128, will cause pivotal movement of the lower arm 72 in a direction returning the upper end of this link from the erected position shown in FIG. 6. The latch handle 130 is further provided with a detent 138 to be engaged under a tang 140 projecting downwardly from the upper wall 34 of the housing body 20. The latch assembly 122 thus operates to retain the camera in the collapsed condition illustrated for example in FIG. 2 of the drawings.

Thus it will be appreciated that by this invention there is provided improved erecting linkage and cover assembly for collapsible bellows-type cameras by which the above-mentioned objectives are completely fulfilled. Also it will be apparent to those skilled in the art from the preceding description that various modifications and/or changes may be made in the disclosed embodiment without departure from the inventive concepts manifested thereby. Accordingly, it is expressly intended that the foregoing description is illustrative of preferred embodiments only, not limiting, and that the true spirit and scope of the present invention will be determined by reference to the appended claims.

I claim:

1. An erecting linkage system for collapsible bellows cameras, said cameras having a lens support movable between collapsed and operative positions with respect to the camera body, said linkage system comprising:
   a cover connected to the camera body on a pivotal axis for movement between opened and closed positions;
   a pair of cam links each connected at one end to said cover and pivotal about their said one end between folded and erect positions upon movement of said cover to said open position, said cam links each having a cam slot therein extending along the central portion of the length thereof;

a lens support locating frame pivotally connected to the other end of said cam links and latchable in an upright position when said cover is in its said open position, said locating frame comprising a U-shaped member having a base and a pair of upstanding legs, the upper end of said legs being pivotally connected at the other ends of said cam links, said legs define a recessed latch formation;

a folding linkage connected to the camera body and to said cover at points spaced from said pivotal axis, said folding linkage including a pair of folding link sets, one to each side of the lens support and each set having a lower link connected to said cover, a follower pin mounted on each of said lower links, each respective follower pin being engageable with one end of said cam slots in a past-dead-center position of said folding link sets and with said latch formation of one of said legs; and a lens support mounting member adjustably connected to said locating frame, said mounting member being also pivotally connected at said other end of said cam links and including a slotted flange connected to the base of said locating frame for pivotal adjustment about an axis intersecting said one end of said cam links.

2. The apparatus recited in claim 1 including latch means supported by said cover for initiating collapsing movement of said linkage and for retaining said cover in said closed position.

3. The apparatus recited in claim 2 wherein said latch means includes a latch member pivotally mounted on the leading edge of said cover as viewed with respect to opening movement thereof, said latch including a pair of tab members operative to engage and pivot said lower links toward a folded position when said cover is in said open position and said latch is urged in a given direction, and said latch member including means for engaging a portion of said camera body when said cover is closed, said latch member being releasable from said camera portion so as to release said cover from its said closed position also responsive to urging of said latch in said given direction.

4. An erecting system for collapsible bellows cameras, said cameras having a lens support movable between collapsed and operative positions with respect to the camera body, said system comprising:

a cover connected to the camera body for pivotal movement between open and closed positions;

a link arrangement connected at one end to said cover and pivotal about said one end from a collapsed to an erect position with respect to said cover;

a lens support locating frame pivotally mounted to said link arrangement for movement about a given axis, said locating frame including means for latching said locating frame to said link arrangement when said link arrangement is in its said erect position;

a lens support mounting member also pivotally mounted to said link arrangement for movement about an axis parallel to and at least closely adjacent said given axis; and means for connecting said mounting member to said frame such that once said lens support is affixed to said mounting member and said frame is latched to said link arrangement in an erect position, said lens support and mounting member assembly may be pivoted into proper alignment with the optical axis of the camera and then secured in such alignment by connecting said assembly to said frame.

5. The system recited in claim 4 wherein said link arrangement includes a pair of spaced apart cam links each pivotably connected at one end to said cover and at the other end on a common axis to both said locating frame and said mounting member.

6. The system recited in claim 5 wherein said locating frame comprises a U-shaped member having a base and a pair of upstanding legs, the upper ends of said legs being pivotably connected at said other ends respectively of said cam links, and said mounting member includes a flange extending between said cam links in adjoining relation to said base of said frame, and said connecting means includes means for connecting said flange to said base.

7. The system recited in claim 6 wherein said flange is located between said base and said cover, said flange having a pair of slots therein, and said connecting means includes bolts extending through said slots into said base.

8. The apparatus recited in claim 7 wherein said cover comprises a frame-like spider through which said bolts are accessible for adjustment of said mounting member with respect to said frame, and a thin cover plate affixed to said spider.

9. The system recited in claim 4 wherein said link arrangement includes a pair of foldable linkage sets, each such set including upper and lower links pivotal with respect to each other between a folded position in the collapsed position of the lens support and an extended past-dead-center position corresponding to said operative position of said lens support, said lower links being pivotally connected to said cover, and said system additionally including a latch member pivotally supported on said cover to releasably retain said cover in said closed position, and said latch member being engageable with said linkage sets to initiate folding movement thereof from said extended past-dead-center position to said folded position.

10. The system recited in claim 9 wherein said latch member includes a latch handle movable with respect to said cover in the direction of cover closing movement to initiate said linkage folding movement.

11. The apparatus recited in claim 10 including means for biasing said linkage sets to their said extended position, means for biasing said latch with respect to said cover in a direction opposing said movement to initiate folding movement of said linkage, and said latch member includes a recessed formation in said latch handle to receive a latch tang in said camera body in the closed position of said cover, whereby the bias of said latch member retains said latch tang in said recessed formation.

12. In a camera of the collapsible bellows type having a lens support moveable between collapsed and operative positions with respect to the camera body, a cover pivotally mounted at one edge to said camera body for movement between a closed position overlying said lens support and an open position alongside said lens support, a latch member displaceably mounted on said cover adjoining an opposite edge thereof, means for biasing said latch member in a given direction into engagement with a portion of said camera body so as to latch said cover in its said closed position, a linkage arrangement coupled to said camera body, said lens support and said cover for displacing said lens support from its said collapsed to its said operative positions responsive to movement of said cover from its said closed arrangement to its said open position, said linkage arrangement including means for biasing said lens support to its said operative position, the improvement comprising said latch member including means operative when said cover is in its open position for engaging said linkage arrangement so as to urge said lens support toward its collapsed position when said latch member is pivoted in said given direction so that said cover is released from its closed position and also urged from its open position by displacement of said latch in said given direction.

13. The improvement of claim 12 wherein said linkage includes a pair of folding link sets positioned on opposite ends of said lens support, each of said link sets including a lower link connected to said cover and displaceable toward said cover so as to fold said link sets, and said latch member includes an elongated bar arrangement extending between said link sets and engageable with each of said lower links such that each lower link is displaced toward said cover upon displacement of said latch member in said given direction.

* * * * *